(12) United States Patent
Dougherty (10) Patent No.: US 10,335,915 B1
(45) Date of Patent: Jul. 2, 2019

(54) KITS AND METHODS FOR INSTALLING A LIGHT SOURCE ON A TOOL REST

(71) Applicant: Michael Dougherty, Jacksonville, NC (US)

(72) Inventor: Michael Dougherty, Jacksonville, NC (US)

( * ) Notice: Subject to any disclaimer, the term of this patent is extended or adjusted under 35 U.S.C. 154(b) by 0 days.

(21) Appl. No.: 15/727,739

(22) Filed: Oct. 9, 2017

Related U.S. Application Data (60) Division of application No. 14/859,450, filed on Sep. 21, 2015, now abandoned, which is a continuation-in-part of application No. 13/953,001, filed on Jul. 29, 2013, now Pat. No. 9,174,319.

(60) Provisional application No. 61/679,917, filed on Aug. 6, 2012.

(51) Int. Cl.
| | | |
|---|---|---|
| *B23Q 17/24* | (2006.01) | |
| *F21V 23/02* | (2006.01) | |
| *F21V 23/06* | (2006.01) | |
| *F21V 23/04* | (2006.01) | |
| F21W 131/403 | (2006.01) | |
| F21Y 101/00 | (2016.01) | |
| F21Y 103/10 | (2016.01) | |

(52) U.S. Cl.
CPC .......... *B23Q 17/2404* (2013.01); *F21V 23/02* (2013.01); *F21V 23/04* (2013.01); *F21V 23/06* (2013.01); *F21W 2131/403* (2013.01); *F21Y 2101/00* (2013.01); *F21Y 2103/10* (2016.08)

(58) Field of Classification Search
CPC ..................... B23Q 17/2404; F21W 2131/403
See application file for complete search history.

(56) References Cited

U.S. PATENT DOCUMENTS

| 1,181,261 | A | | 5/1916 | Schmidt |
| --- | --- | --- | --- | --- |
| 2,174,827 | A | | 10/1939 | Latham |
| 2,310,166 | A | | 2/1943 | Way |
| 2,588,288 | A | | 3/1952 | Pohanka |
| 2,697,456 | A | | 12/1954 | Goldschmidt |
| 2,740,037 | A | * | 3/1956 | Strachan, Jr. ...... B23Q 17/2404 191/12.2 R |
| 3,640,321 | A | | 2/1972 | Walton ........................... 142/55 |
| 3,824,401 | A | | 7/1974 | Suzuki .......................... 250/561 |
| 3,894,225 | A | * | 7/1975 | Chao ....................... G09F 13/28 174/117 A |
| 4,018,113 | A | | 4/1977 | Blaznin et al. ..................... 82/2 |
| 4,133,357 | A | | 1/1979 | Groya et al. .................... 142/49 |
| 4,227,902 | A | | 10/1980 | Olson ............................ 55/302 |
| 4,255,056 | A | | 3/1981 | Peterson ....................... 356/401 |
| 4,597,030 | A | | 6/1986 | Brody et al. .................... 362/32 |
| 4,615,365 | A | | 10/1986 | Arnall ............................ 142/49 |
| 4,748,571 | A | | 5/1988 | Shippy ......................... 264/513 |

(Continued)

FOREIGN PATENT DOCUMENTS

AT          9434 U1 * 10/2007 ......... B23Q 17/2404

*Primary Examiner* — Alan Snyder
(74) *Attorney, Agent, or Firm* — MacCord Mason PLLC (57) ABSTRACT

A kit and method for installing a light source onto a lathe tool rest for improving the illumination of the workpiece is described. The kit includes a rectangular array of two or more LED light sources on a front side of a strip and a power source comprising a cord having one end connected to a rear side of the strip. Methods for installing the kit may include drilling a hole through a tool rest so that the cord extends through the rear side to avoid obstructing the lathe.

16 Claims, 6 Drawing Sheets

(56) References Cited

U.S. PATENT DOCUMENTS

| | | | |
|---|---|---|---|
| 4,761,720 A | 8/1988 | Solow | 362/252 |
| 4,833,782 A | 5/1989 | Smith | |
| 4,887,193 A | 12/1989 | Dieckmann | 362/89 |
| 5,224,529 A | 7/1993 | Kenny | 142/42 |
| 5,392,122 A | 2/1995 | Ulanov et al. | 356/372 |
| 5,500,989 A | 3/1996 | Ford et al. | 29/27 R |
| 5,597,495 A | 1/1997 | Keil et al. | 216/66 |
| 5,653,273 A | 8/1997 | Bach | 144/1.1 |
| 5,992,482 A | 11/1999 | Voisey | 142/49 |
| 6,000,447 A | 12/1999 | Clay | 142/49 |
| 6,076,937 A | 6/2000 | Wood et al. | 362/154 |
| 6,561,062 B2 | 5/2003 | Miller | 82/115 |
| 6,616,295 B2 | 9/2003 | Sako et al. | 362/119 |
| 6,951,408 B2 | 10/2005 | Stewart | 362/183 |
| 7,034,230 B2 | 4/2006 | Fan | 174/117 |
| 7,101,058 B2 | 9/2006 | Prell et al. | 362/191 |
| 7,549,784 B1 | 6/2009 | Teeters | 362/576 |
| 7,874,234 B2 | 1/2011 | Clay | 82/149 |
| 7,874,243 B2 | 1/2011 | Clay | 82/149 |
| 8,047,106 B2 | 11/2011 | Chang | 83/117 |
| 8,104,913 B2 | 1/2012 | Wright | 362/119 |
| 2006/0077656 A1 | 4/2006 | Huang | 362/189 |
| 2006/0203469 A1 | 9/2006 | Niemann | 362/89 |
| 2010/0085730 A1 | 4/2010 | Chen et al. | |

\* cited by examiner

KITS AND METHODS FOR INSTALLING A LIGHT SOURCE ON A TOOL REST

This application is a divisional of U.S. patent application Ser. No. 14/859,450 filed Sep. 21, 2015, which is a continuation-in-part of U.S. Pat. No. 9,174,319 issued on Nov. 3, 2015, which claims the benefit of the filing date of U.S. Patent Application Ser. No. 61/679,917, filed Aug. 6, 2012, which is incorporated herein in its entirety.

BACKGROUND OF THE INVENTION

(1) Field of the Invention

The present invention relates generally to tool rests for lathes, and in particular to a lathe tool rest having an illumination source mounted on the tool rest.

(2) Description of the Prior Art

Lathes are tools used to remove material from a workpiece by holding a cutting tool against the workpiece as the workpiece is rotated. The workpiece is most commonly wood, but may be metal, plastic or other material. Generally, the lathe is comprised of a bed with bed rails, a headstock with a rotatable horizontal spindle fixed or slidably mounted at one end of the bed rails, a tailstock with a tailstock barrel slidably mounted at the opposite end of the bed rails, and a tool rest mounted between the headstock and the tailstock.

Generally, the tool rest is mounted on a saddle, also known as a banjo, that is slidable on the bed rails and also adjustable inwardly and outwardly. The tool rest is comprised of a vertical post that is inserted into a recess in the saddle and a horizontal tool arm that is mounted on the top end of the post. The post is vertically adjustable to raise and lower the tool arm to the desired position, which is usually approximately in a plane with or slightly below the point at which the cutting tool engages the workpiece.

In use, the workpiece is mounted on the headstock, and on the tailstock if needed. The tool rest horizontal arm is placed close to, e.g., about one-half inch away, from the path of the workpiece surface. The cutting tool is then held against the upper surface of the tool rest arm and the tip of the tool is then moved into engagement with the workpiece, thereby cutting, chipping or scraping away pieces of the workpiece to round the workpiece to the desired shape.

Viewing of the workpiece, in particular the area being contacted by the cutting tool, is generally with the benefit of overhead room lighting. However, additional lighting is often provided by lights that are positioned in the vicinity of the lathe, e.g., clamp-on or magnetically attached lamps with flexible or articulating arms. However, these prior art lighting means often do not provide adequate lighting, particularly when detailed cutting is being done, or when the cutting is inside a workpiece recess, such as the inside of a bowl. In addition, the light may interfere with the operator's access. Therefore, there is a continuing need for a means for better lighting a lathe and workpiece during cutting of the workpiece.

SUMMARY OF THE INVENTION

The present invention addresses this need by providing an improved tool rest that has a light source attached to or built into the tool rest. More specifically, the present invention is directed to a modified lathe tool rest that has a front side, i.e., the side of the tool rest that is toward the workpiece when the tool rest is mounted on the lathe for use, a rear side and an upper tool surface. Various prior art tool rests are suitable for modification, including tool rests with straight front sides, and tool rests with curved front sides.

In accordance with the present invention, the tool rest is modified by the addition of a light source to the tool rest front surface. The preferred light source is an LED strip as described herein. However, while the invention will be described in the context of an LED strip, it is understood that other low profile, low voltage, direct current light sources, such as halogen lights, are contemplated by the present invention.

The LED strip may be attached to the front surface, or the front surface may preferably include a recess into which the LED strip is inserted. The LED strip preferably extends along the entire front surface, but can be shorter than the length of the front surface, if desired.

LED strips used in the present invention are commercially available LED strips that can be purchased from one of several Internet suppliers. These strips are normally sold in a roll that may be several feet in length and are designed so that the purchaser can cut off the desired length from the strip. The end of the LED strip segment can then be attached, e.g., by a solderless connector, to a source of electricity. For greatest visibility, the LED lights are preferably white.

LED lights are normally powered by a 12V power source. While a battery may be used for the purpose, power is usually obtained for a 110V AC power source, e.g, a wall outlet, through an AC/DC transformer. Transformers for this use are readily available commercially. An on/off switch will usually be included in the circuit. To keep wiring out of the work area, electrical wiring from the LED strip preferably extends through a hole or slot in the tool rest so that the electrical wire extends out of the rear surface of the tool rest.

In some embodiments, the present invention is directed to a kit for mounting a light source onto a tool rest including a rectangular array of two or more light sources on a front side of a strip, and a power source including a cord having one end connected to a rear side of the strip. The strip can be flexible to accommodate various tool rest shapes, and may be mounted using adhesive found on the rear side of the strip.

The cord may be a unitary item attached to the strip at one end and having a power plug at the opposing end. In yet other embodiments, however, the cord may include a power connector comprising a first portion attached to the strip at one end with a male connector at its opposing end, and a second portion having a female receiver at one end capable of receiving the male connector and with a power plug at the opposing end to be received by a power socket. The cord supplies power to the strip once the power plug is connected to the power socket and the female receiver is connected to the male connector. The kit may also include a transformer to regulate the voltage supplied to the light source.

In operation, a light source may be installed onto a tool rest by drilling a hole through the tool rest and mounting a light source onto the front side of the tool rest. The power cord is inserted through the hole so the power cord extends from the light source on the front side to the back side of the tool rest. These and other methods are disclosed herein.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Numerous tool rest designs are used with lathes depending on the work to be performed. It will be understood that the present invention is applicable to all tool rest configurations, the only requirement being that the tool rest includes a front surface upon which an LED light source large enough to provide the desired illumination can be mounted. The tool rest may be sold as new equipment or as a retrofit to existing lathes. The lighting source may be sold pre-installed on a tool rest, or may be sold as a retrofit kit that can be installed on a tool rest already owned by a user.

The accompanying drawings are intended to illustrate two tool rest designs upon which the LED strip is attached. It will be understood that the shape of the tool rest is not critical to the invention, and that the light strip can be attached to the front surface of a wide variety of tool rests.

Figures 1, 2, 3:
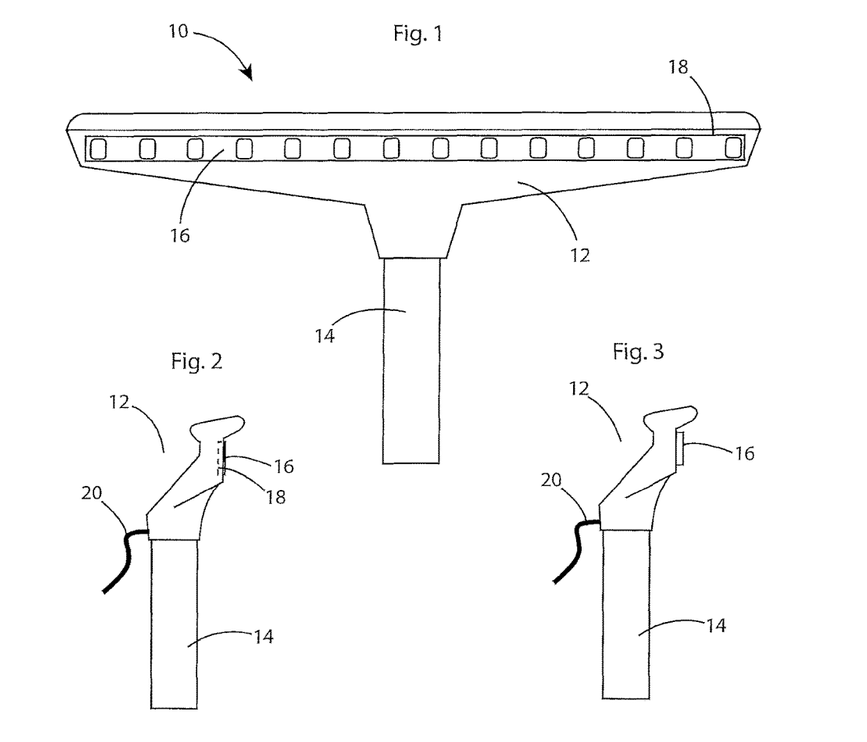
FIG. 1 is a front view of one type of tool rest with an LED light strip secured to the front surface of the tool rest arm.
FIG. 2 is a side view of the tool rest of FIG. 1 with the LED strip mounted in a recess in the front surface of the tool rest arm.
FIG. 3 is a side view of a tool rest of the same type as shown in FIGS. 1 and 2, but with the LED strip mounted on the front surface of the tool rest arm.

FIGS. 1-3 illustrate a first type of tool rest, generally 10, comprised of a straight tool rest arm 12 supported on post 14. FIGS. 1 and 2 illustrate modification of this type of tool rest by attachment of LED strip 16 within horizontal recess 18. Alternatively, strip 16 can be mounted on the front surface of arm 12 as shown in FIG. 3. Strip 16 can be attached to arm 12 by various known means, such as fasteners, but will normally be attached with adhesive. Preferably, strip 16 extends substantially the width of arm 12. It will be understood, however, that a shorter LED strip is also contemplated. Strip 16 is connected to an electrical power source, not shown, by wire 20.

Figure 4:
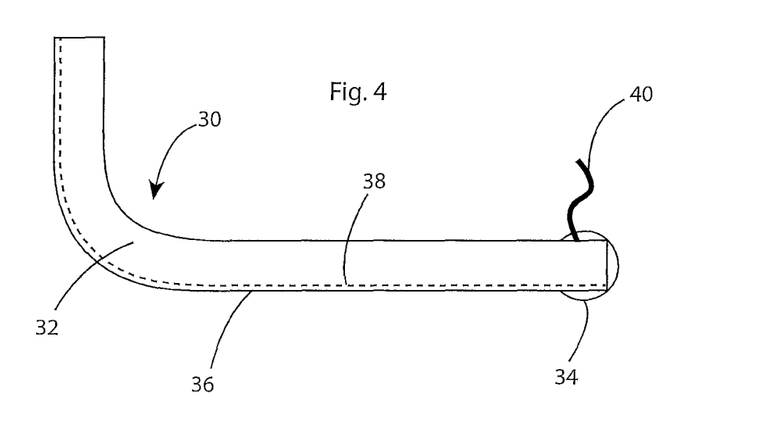
FIG. 4 is a top view of another type of tool rest with an LED light strip secured within a recess in the front surface of the tool rest arm.
Figure 5:
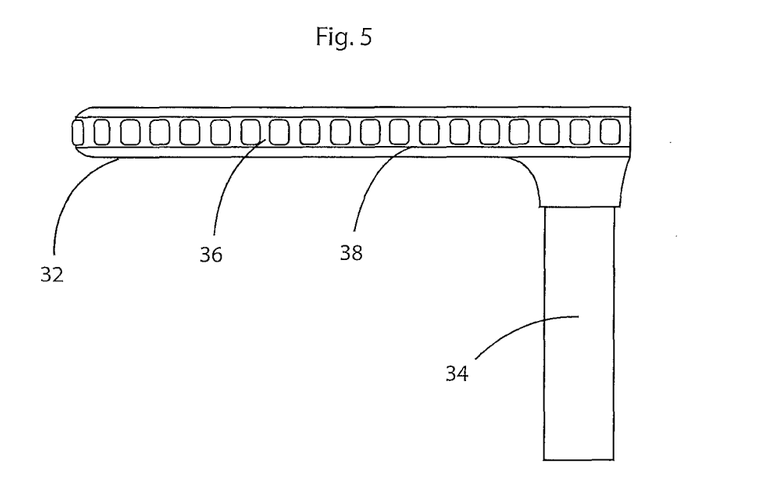
FIG. 5 is a front view of the tool rest of FIG. 4.

FIGS. 4-5 illustrate another tool rest, generally 30, having a curved arm 32 with a round cross-section mounted on post 34. LED strip 36 is mounted within recess 38 and connected to an electrical power source via wire 40.

Figure 6:
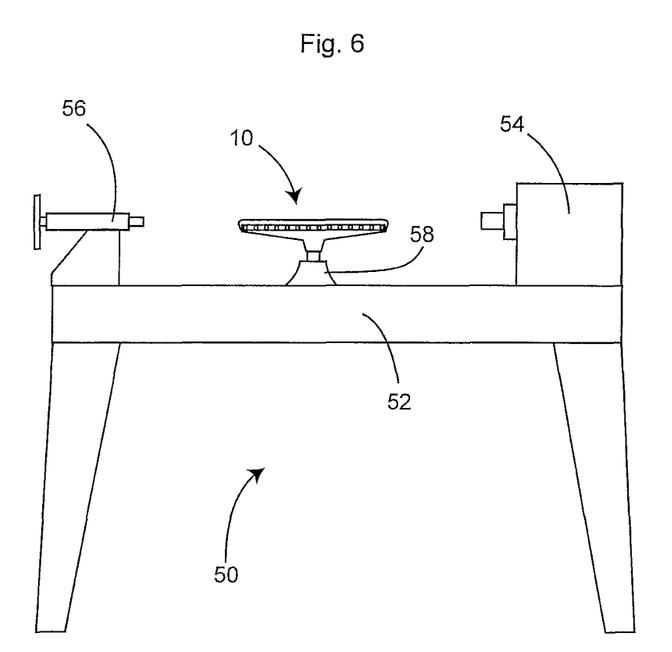
FIG. 6 is a front view of a lathe including the tool rest.

FIG. 6 illustrates tool rest 10 mounted on a wood lathe, generally 50. Lathe 50 includes a bed 52, a headstock 54, a tailstock 56, and a saddle or banjo 58.

Figure 7:
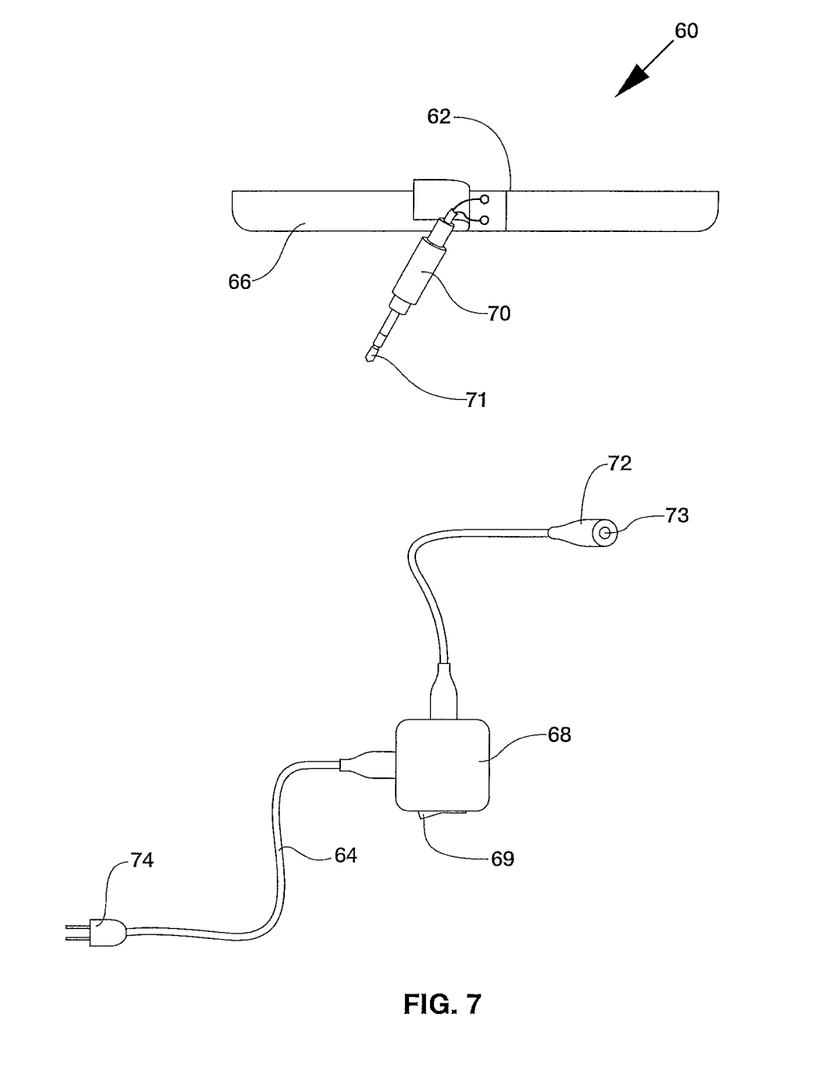
FIG. 7 is a perspective view of one embodiment for a kit of materials to install a light source on a tool rest.

FIG. 7 illustrates one embodiment of a kit 60 that can be used to install an LED light strip 62 onto a tool rest. LED light strip 62 is a generally rectangular array of one or more LEDs, and may be flexible to accommodate a variety of tool rest shapes. LED light strip 62 may be mounted on the front side of a tool rest by any number of means, including fastening the strip onto the tool rest using a bolt or strap. As depicted in FIG. 7, LED light strip 62 includes an adhesive backing 66 to adhere onto the front side of a tool rest.

The kit 60 also includes a cord 64 used to supply power to LED light strip 62. Cord 64 is preferably placed on the rear of LED light strip 62. As shown in FIG. 7, cord 64 is located centrally in relation to LED light strip 62. Yet in other embodiments, cord 64 may be located away from the center of LED light strip 62. Alternatively, cord 64 may be found on an end of LED light strip 62, such as the left or right sides.

In some embodiments, cord 64 may be a unitary item affixed to LED light strip 62 at one end and having a power plug at the opposing end. In yet other embodiments, however, cord 64 is a two-unit cord with a male connector and female receiver. Two-unit cords may be useful to eliminate a portion of the cord when light is not needed and for easier storage when LED light strip 62 is not in use. Cord 64 may comprise additional units depending on the number of components used for the power source. For instance, the kit may further include a transformer or other power supply 68. Cord 64 may be integrally affixed or separately detachable from power supply 68.

Power supply 68 may be a low voltage transformer that decreases the supply voltage coming from the power outlet to LED light strip 62 when LED light strip 62 uses a low voltage circuit. For example, the kit may include a 12 volt LED light strip 62 with an accompanying low voltage transformer.

In the embodiment shown in FIG. 7, the kit includes a cord 64 with a transformer 68 and a coaxial power connector having a first portion 70 and a second portion 72. First portion 70 is attached to the strip at one end and has a male connector 71 at its opposing end. Second portion 72 includes a female receiver 73 at one end adapted to receive male connector 71. The other end of second portion 72 is connected to transformer 68. Transformer 68 connects to cord 64 having a power plug 74 at the opposing end to be received by a power socket. Cord 64 supplies power to LED light strip 62 once the power plug 74 is connected to a power socket and female receiver 73 is connected to male connector 71. Transformer 68 may further include an on/off switch 69 for LED light strip 62. When not in use, male connector 71 can be disconnected to female receiver 73 so that second portion 72 and other components may be stowed away.

Other embodiments of cord 64 and transformer 68 may include detachable unitary cords such as an AC adapter or multiple component cords such as an AC adapter including a power brick, and are not limited to the examples disclosed above. FIG. 7 shows first portion 70 soldered onto a center tapped LED light strip 62. However, cord 64 may be installed onto LED light strip 62 using any number of means, including plugging into a connector on the LED strip.

Figure 8A:
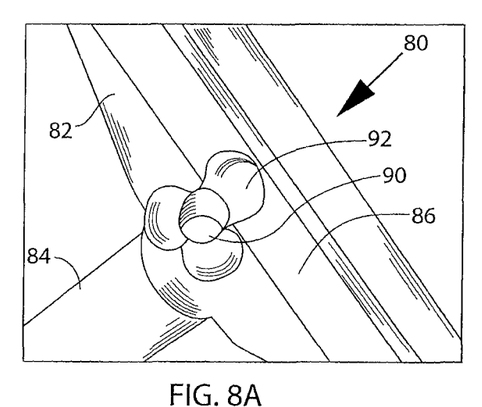
FIG. 8A is a front view of a tool rest with a hole sized and shaped to receive a cord having a power connector.
Figure 8B:
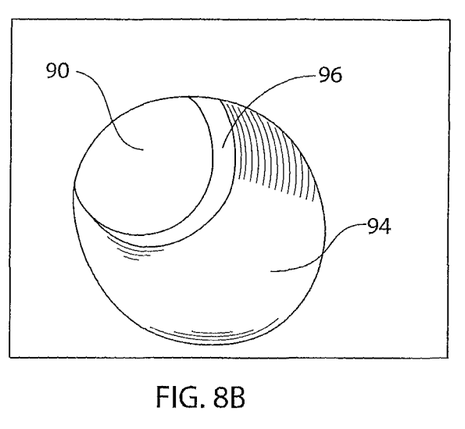
FIG. 8B is a close-up rear view of a tool rest with a hole sized and shaped to receive a cord having a power connector.

FIGS. 8A and 8B illustrate a tool rest 80 adapted for installing a kit as described above. Tool rest 80 comprises a horizontal tool arm 82 attached to the upper end of a vertical support member 84. As shown in FIG. 8A, the front side of horizontal tool arm 82 may include a recess 86 to mount LED light strip 62. When installing the kit, a user may be instructed to drill a hole 90 through horizontal tool arm 82.

Hole 90 allows cord 64 to pass through so that cord 64 extends from the back side of tool rest 80 to avoid obstructing the lathe or tool rest while in operation. Although hole 90 is shown at the intersection of horizontal tool arm 82 and vertical support member 84, hole 90 may be placed anywhere along horizontal tool arm 82 depending on where cord 64 is connected to LED light strip 62 or how tool rest 80 is shaped. A user may also be instructed to drill niche 92 to create additional space for the power components.

FIG. 8B shows a close-up view of hole 90 from the rear side of tool rest 80. In this embodiment, the user is instructed to use a larger drill bit to create a countersink in the form of an optional recess 94 of a suggested depth to receive the female receiver 73 of second portion 72. This provides a slight ridge 96 inside the bore of the hole 90 to act as a stop that prevents pushing male connector 71 through the hole when plugging in female receiver 73 into the tool rest 80.

Figure 9A:
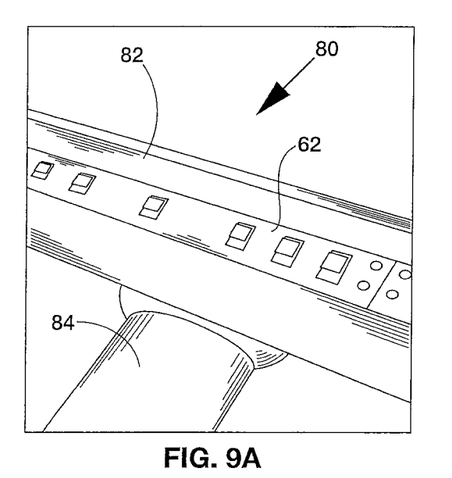
FIG. 9A is a front view of the tool rest of FIGS. 8A and 8B with an LED light strip installed using the kit of FIG. 7.
Figure 9B:
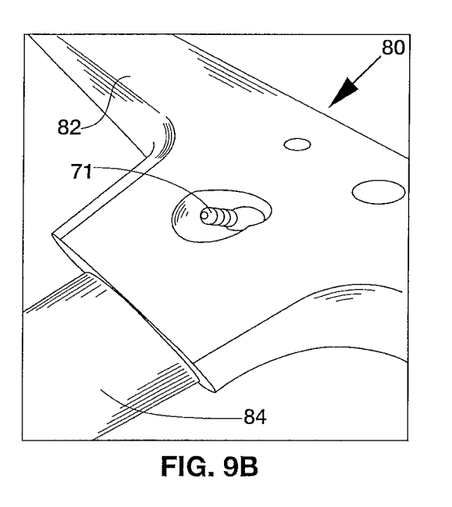
FIG. 9B is a close-up rear view of the tool rest of FIGS. 8A and 8B with an LED light strip partially installed using the kit of FIG. 7.

FIG. 9A shows tool rest 80 with LED light strip 62 installed on the front side of horizontal tool arm 82. FIG. 9B shows the rear side of tool rest 80, where male connector 71 is seen protruding out of hole 90. Preferably, a sealing compound is applied around the connector 71 to hold it in place within the recess 94.

The kit can be installed in other ways, as well. For example, instead of a hole through the tool rest, a groove or notch can be cut to fit the power cord. Clips can be added to retain the power cord in place on the tool rest.

Certain modifications and improvements will occur to those skilled in the art upon a reading of the foregoing description. By way of example, other types of light sources may be mounted onto the front side of the tool rest. Also, the size and shape of the tool rest may dictate whether a hole is needed to prevent cord obstruction, and where the hole should ideally be located. The overall size and shape of the hole may also depend on the type of power cord used with the kit. It should be understood that all such modifications and improvements have been deleted herein for the sake of conciseness and readability but are properly within the scope of the following claims.

What is claimed is:

1. A method of installing a light source onto a tool rest having a front side and a back side, the method comprising the steps of:
    drilling a hole through the tool rest, including drilling a small diameter hole through the tool rest and a large diameter hole as a countersink on the back side of the tool rest, and installing a male connector to the power cord in the countersink,
    measuring a length of a horizontal member of the tool rest,
    cutting one or more strips of an array of LED lights from a roll of LED strip tape, threading the power cord through the hole, applying a sealing compound to fix the power cord in place in the hole,
    connecting a power cord to an end of one strip,
    mounting a light source onto the front side of the tool rest by mounting the strips onto the tool rest,
    inserting a power cord through the hole in the tool rest so the power cord extends from the light source on the front side to the back side; and
    connecting the strips to a power source.

2. The method of claim 1 wherein drilling includes drilling the small diameter hole and the large diameter hole at an intersection between a horizontal tool arm of the tool rest and a vertical support member of the tool rest.

3. The method of claim 1 wherein threading comprises threading a first portion of the power cord having a male connector through the hole and attaching the male connector to a female receiver from a second portion of the power cord.

4. The method of claim 3 wherein applying a sealing compound includes applying the sealing compound around the male connector to hold it in place within the large diameter hole.

5. The method of claim 1 wherein drilling includes drilling a groove adapted to fit a portion of the power cord on the tool rest.

6. A method of installing a light source onto a tool rest having a front side and a back side, the method comprising the steps of:
    drilling a hole through the tool rest,
    measuring a length of a horizontal member of the tool rest,
    cutting one or more strips of an array of LED lights from a roll of LED strip tape,
    mounting a light source onto the front side of the tool rest by mounting the strips onto the tool rest and adhering the strips onto the front side of the tool rest,
    inserting a power cord through the hole in the tool rest so the power cord extends from the light source on the front side to the back side;
    connecting the strips to a power source.

7. The method of claim 6 further including adding a clip to retain the power cord in place on the tool rest.

8. The method of claim 6 wherein adhering comprises adhering the strips onto a horizontal arm located on the front side of the tool rest.

9. A method of installing a light source onto a tool rest, the method comprising the steps of:
    measuring a length of a horizontal member of the tool rest,
    cutting one or more strips of an array of LED lights from a roll of LED strip tape,
    adhering the strips onto the tool rest, and
    drilling a small diameter hole through the tool rest and a large diameter hole as a countersink on the back side of the tool rest,
    connecting a power cord to an end of one strip,
    threading a first portion of the power cord having a male connector through the hole and attaching the male connector to a female receiver from a second portion of the power cord, and
    applying a sealing compound to fix the first portion of the power cord in place in the large diameter hole.

10. A method of installing a light source onto a tool rest having a front side and a back side, the method comprising the steps of:
    drilling a hole through the tool rest,
    mounting a light source onto the front side of the tool rest,
    inserting a first portion of a power cord having a male connector through the hole in the tool rest so the power cord extends from the light source on the front side to the back side, and
    attaching the male connector of the first portion of the power cord to a female receiver of a second portion of the power cord.

11. The method of claim 10 wherein drilling includes drilling the small diameter hole and the large diameter hole at an intersection between a horizontal tool arm of the tool rest and a vertical support member of the tool rest.

12. The method of claim 10 wherein inserting comprises threading a first portion of the power cord having a male connector through the hole.

13. The method of claim 10 including applying a sealing compound around the male connector to hold it in place within the large diameter hole.

14. The method of claim 10 wherein drilling includes drilling a groove adapted to fit a portion of the power cord on the tool rest.

15. The method of claim 10 further including adding a clip to retain the power cord in place on the tool rest.

16. The method of claim 10 wherein mounting a light source includes cutting one or more strips of an array of LED lights from a roll of LED strip tape and adhering the strips onto a horizontal arm located on the front side of the tool rest.

\* \* \* \* \*